US010704568B2

(12) United States Patent
John et al.

(10) Patent No.: US 10,704,568 B2
(45) Date of Patent: Jul. 7, 2020

(54) ASPIRATOR INTEGRATED PRESSURE RELIEF VALVE AND VENT VALVE ASSEMBLY FOR AN INFLATION SYSTEM

(71) Applicant: GOODRICH CORPORATION, Charlotte, NC (US)

(72) Inventors: Poly Puthur John, Karnataka (IN); Priyank Anavadiya, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 11 days.

(21) Appl. No.: 16/153,156

(22) Filed: Oct. 5, 2018

(65) Prior Publication Data
US 2019/0249689 A1 Aug. 15, 2019

(30) Foreign Application Priority Data
Feb. 15, 2018 (IN) .............................. 201811005755

(51) Int. Cl.
| F04F 1/18 | (2006.01) |
| F04F 99/00 | (2009.01) |
| F16K 15/20 | (2006.01) |
| F16K 15/18 | (2006.01) |
| B63C 9/04 | (2006.01) |
| B64D 25/14 | (2006.01) |
| A62B 1/20 | (2006.01) |
| B63B 35/58 | (2006.01) |

(52) U.S. Cl.
CPC ............... *F04F 1/18* (2013.01); *F04F 99/00* (2013.01); *F16K 15/18* (2013.01); *F16K 15/207* (2013.01); *A62B 1/20* (2013.01); *B63B 35/58* (2013.01); *B63C 2009/042* (2013.01); *B64D 25/14* (2013.01); *Y10T 137/2605* (2015.04)

(58) Field of Classification Search
CPC ..... A62B 1/20; B64D 25/14; Y10T 137/2605; Y10T 137/261
USPC .............................. 193/25 B; 244/905, 137.2
See application file for complete search history.

(56) References Cited

U.S. PATENT DOCUMENTS

| 3,400,735 | A | | 9/1968 | Favors et al. |
| 3,572,974 | A | | 3/1971 | Day |
| RE27,860 | E | * | 1/1974 | Day ....................... B64D 25/14 |
| | | | | 417/184 |
| 4,566,862 | A | * | 1/1986 | Halavais ................... F04F 5/48 |
| | | | | 417/174 |
| 5,002,465 | A | * | 3/1991 | Lagen ..................... F04F 5/466 |
| | | | | 417/181 |
| 6,240,951 | B1 | | 6/2001 | Yori |

(Continued)

Primary Examiner — Robert K Arundale
(74) Attorney, Agent, or Firm — Cantor Colburn LLP

(57) ABSTRACT

A valve assembly for an inflation system that includes a pressure relief valve and a vent valve. The pressure relief valve has a pressure relief housing and a pressure relief valve poppet. The pressure relief housing defines a first pressure relief cavity that is disposed between a first end wall defining a first flow port and a first wall defining a passageway and a second pressure relief cavity disposed between the first wall and a second wall. The pressure relief valve poppet is movably disposed within the first pressure relief cavity and the second pressure relief cavity. The vent valve has a vent housing and a vent valve poppet. The vent housing defines a vent cavity that is disposed between the second wall defining a vent flow port and a second end wall. The vent valve poppet is movably disposed within the vent cavity.

15 Claims, 3 Drawing Sheets

(56) References Cited

U.S. PATENT DOCUMENTS

| | | |
|---|---|---|
| 6,321,770 B1 | 11/2001 | Hintzman et al. |
| 6,659,404 B1 | 12/2003 | Roemke |
| 8,066,493 B2 | 11/2011 | Renz et al. |
| 2010/0266424 A1* | 10/2010 | Renz .................. F04F 5/463 417/191 |
| 2017/0297726 A1 | 10/2017 | Volny et al. |
| 2019/0353263 A1* | 11/2019 | John .................. F16K 31/42 |

* cited by examiner

US 10,704,568 B2

ASPIRATOR INTEGRATED PRESSURE RELIEF VALVE AND VENT VALVE ASSEMBLY FOR AN INFLATION SYSTEM

CROSS-REFERENCES TO RELATED APPLICATIONS

This patent application claims the benefit of Indian Patent Application Serial No. 201811005755, filed Feb. 15, 2018, which is incorporated herein by reference in its entirety.

BACKGROUND

Exemplary embodiments pertain to the art of inflation systems having aspirators.

An inflation system may be provided to rapidly inflate an inflatable structure such as an emergency exit slide or raft. The inflation system may eject a high velocity primary gas through an aspirator and is directed into the inflatable structure leading to a pressure differential which entrains ambient air into the inflatable structure. A pressure relief valve may be provided with the inflation system to prevent over pressurization of inflatable structure and mitigate pressure fluctuations.

BRIEF DESCRIPTION

Disclosed is an inflation system that includes an aspirator and a valve assembly. The aspirator has an aspirator body defining an outlet fluidly connected to an inflatable structure, a vent port, and an inlet fluidly connected to a pressure source. The valve assembly is fluidly connected to the aspirator body through the vent port. The valve assembly includes a pressure relief valve and a vent valve. The relief valve has a pressure relief housing defining a first pressure relief cavity and a second pressure relief cavity and a pressure relief valve poppet movably disposed within the first pressure relief cavity and the second pressure relief cavity. The vent valve has a vent housing defining a vent cavity and a vent valve poppet movably disposed within the vent cavity.

Also disclosed is a valve assembly for an inflation system that includes a pressure relief valve and a vent valve. The pressure relief valve has a pressure relief housing and a pressure relief valve poppet. The pressure relief housing defines a first pressure relief cavity that is disposed between a first end wall defining a first flow port and a first wall defining a passageway and a second pressure relief cavity disposed between the first wall and a second wall. The pressure relief valve poppet is movably disposed within the first pressure relief cavity and the second pressure relief cavity. The vent valve has a vent housing and a vent valve poppet. The vent housing defines a vent cavity that is disposed between the second wall defining a vent flow port and a second end wall. The vent valve poppet is movably disposed within the vent cavity.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
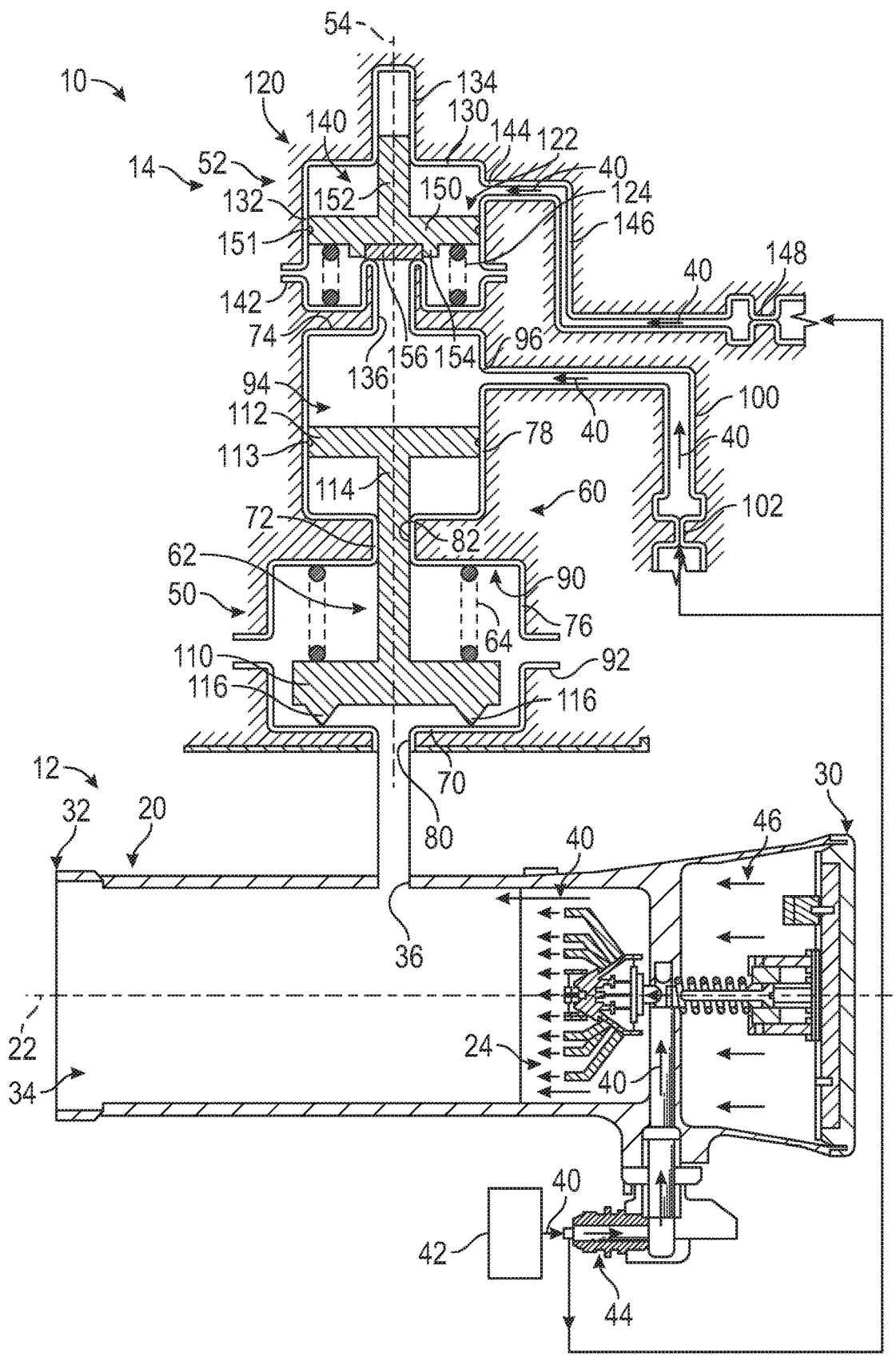
FIG. 1 is a schematic illustration of an inflation system.

Referring to FIG. 1, an inflation system 10 is illustrated. The inflation system 10 is arranged to rapidly inflate an inflatable structure or device such as an inflatable escape device, evacuation slide, raft, etc. The inflation system 10 includes an aspirator 12 and a valve assembly 14.

The aspirator 12 includes an aspirator body 20 that extends along a longitudinal axis 22 and a plurality of nozzles 24 that are disposed within the aspirator body 20. The longitudinal axis 22 may be a central longitudinal axis about which the aspirator body 20 and the plurality of nozzles 24 are disposed.

The aspirator body 20 extends between a first end 30 and a second end 32 along the longitudinal axis 22. The aspirator body 20 defines a fluid channel 34 and a vent port 36. The fluid channel 34 receives a first fluid flow 40 from a pressure source 42 through an inlet 44. The first fluid flow 40 may be at least partially discharged through the plurality of nozzles 24 into the fluid channel 34. The discharging of the first fluid flow 40 causes the fluid channel 34 to receive/entrain/induce a second fluid flow 46 from a second fluid source (e.g. ambient air) through the first end 30. The first fluid flow 40 and the second fluid flow 46 are mixed within the fluid channel 34 downstream of the plurality of nozzles 24 and are discharged through the second end 32 that defines an outlet that is fluidly connected to the inflatable structure or device.

The valve assembly 14 is fluidly connected to the fluid channel 34 of the aspirator body 20 of the aspirator 12 through the vent port 36. The valve assembly 14 may be disposed within the aspirator body 20 or may be fluidly connected to the aspirator body 20 through a conduit.

The valve assembly 14 is arranged to release, vent, or relieve an overpressure or a fluid pressure greater than a threshold after completion of inflation of the inflatable structure or device. The valve assembly 14 includes a pressure relief valve 50 and a vent valve 52 that is fluidly connected to the pressure relief valve 50. The pressure relief valve 50 and the vent valve 52 extend along an axis 54. The axis 54 may be disposed generally transverse to the longitudinal axis 22.

The pressure relief valve 50 includes a pressure relief housing 60, a pressure relief valve poppet 62, and a first biasing member 64.

The pressure relief housing 60 includes a first end wall 70, a first wall 72, a second wall 74, a first perimeter wall 76, and a second perimeter wall 78. The first end wall 70 may be disposed proximate the aspirator body 20, as shown in FIG. 1. The first end wall 70 may be at least partially defined by the aspirator body 20, as shown in FIGS. 2-5. The first end wall 70 defines a first flow port 80 and in some embodiments, the first end wall 70 at least partially defines the vent port 36.

The first wall 72 is spaced apart from the first end wall 70 along the axis 54. The first wall 72 defines a passageway 82. The passageway 82 may be disposed about the axis 54.

The second wall 74 may be defined by or included with either the pressure relief valve 50 and/or the vent valve 52.

The second wall 74 is disposed between the pressure relief valve 50 and the vent valve 52. The second wall 74 is spaced apart from the first wall 72 along the axis 54 such that the first wall 72 is disposed between the first end wall 70 and the second wall 74.

The first perimeter wall 76 extends between the first end wall 70 and the first wall 72 along the axis 54. The pressure relief housing 60 defines a first pressure relief cavity 90 that is disposed between the first end wall 70 and the first wall 72 and is defined by the first end wall 70, the first wall 72, and the first perimeter wall 76.

The pressure relief housing 60 defines a first vent port 92 that is fluidly connected to the first pressure relief cavity 90. The first vent port 92 may be defined by at least one of the first perimeter wall 76 or the first wall 72.

The second perimeter wall 78 extends between the first wall 72 and the second wall 74 along the axis 54. The pressure relief housing 60 defines a second pressure relief cavity 94 that is disposed between the first wall 72 and the second wall 74 and is defined by the first wall 72, the second wall 74, and the second perimeter wall 78. The second pressure relief cavity 94 is arranged relative to the first pressure relief cavity 90 such that the first wall 72 is disposed between the first pressure relief cavity 90 and the second pressure relief cavity 94.

Figure 3:
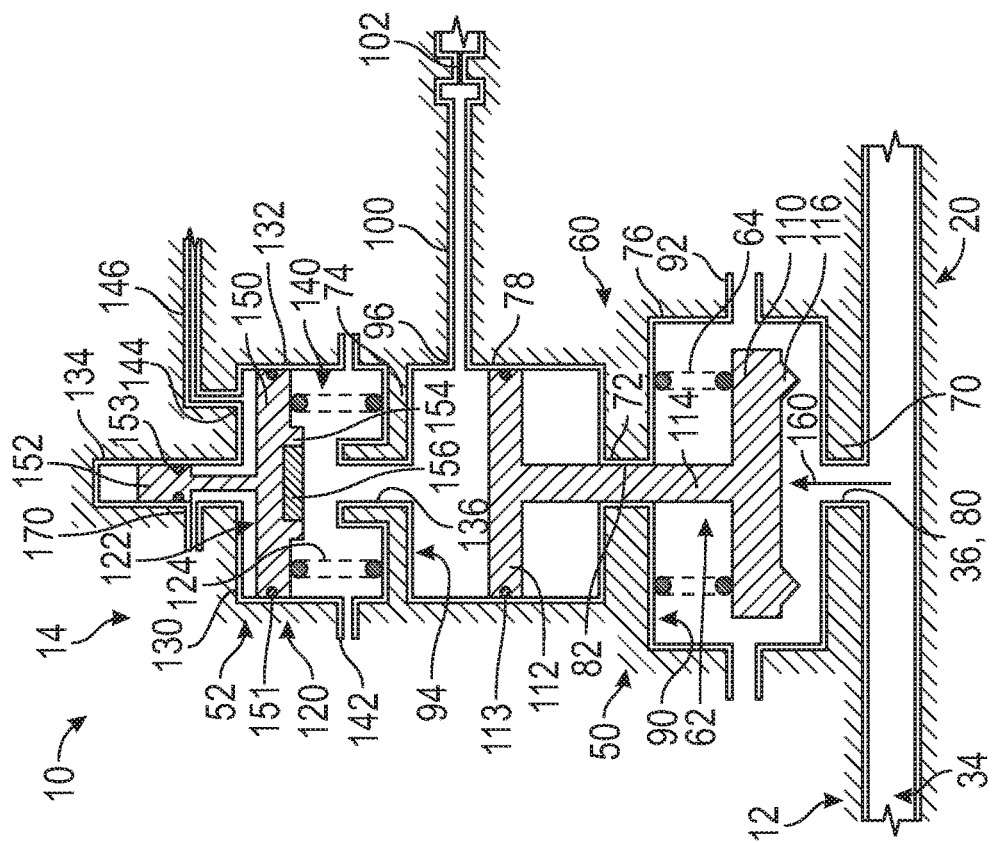
FIG. 3 is a schematic illustration of the valve assembly in an open position.
Figure 2:
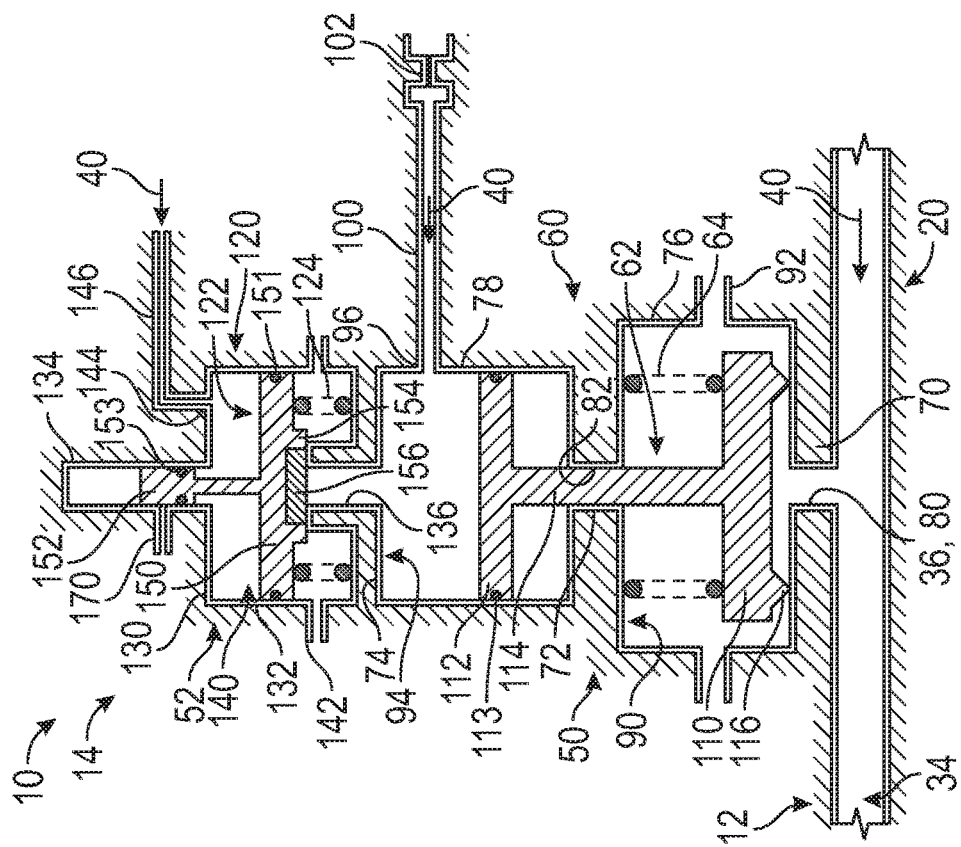
FIG. 2 is a schematic illustration of a valve assembly of the inflation system in a closed position.
Figure 4:
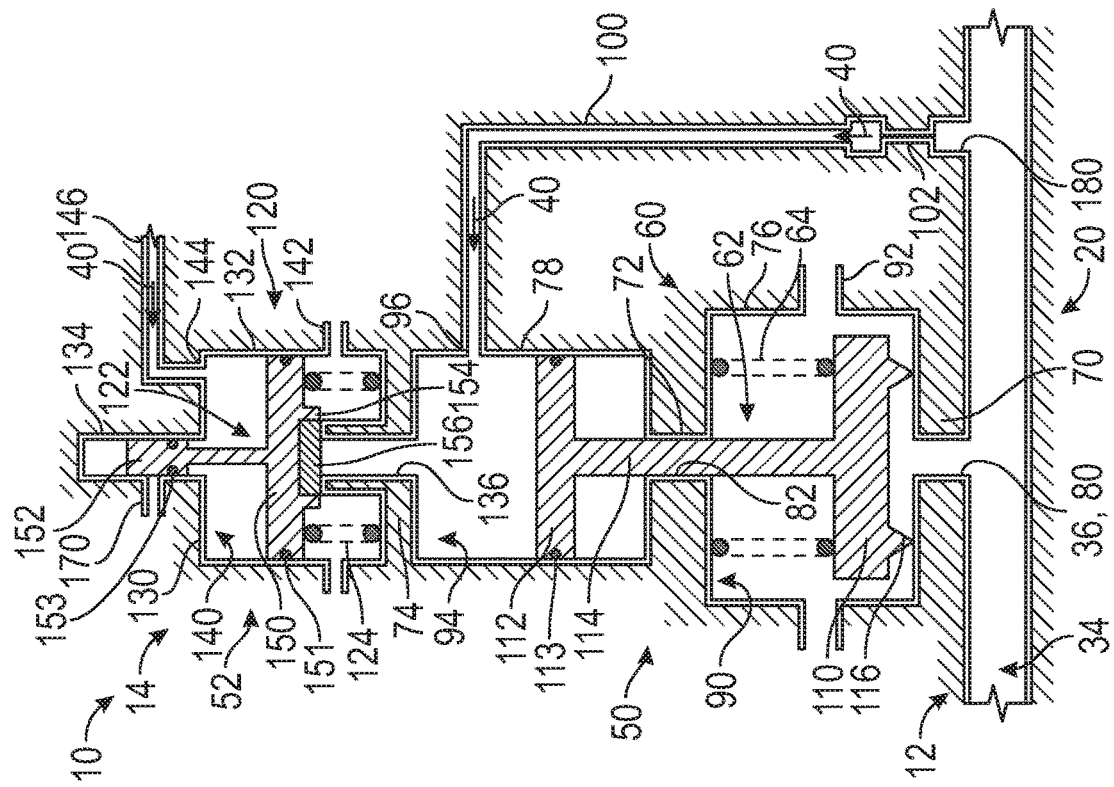
FIG. 4 is a schematic illustration of a valve assembly of the inflation system in a closed position.
Figure 5:
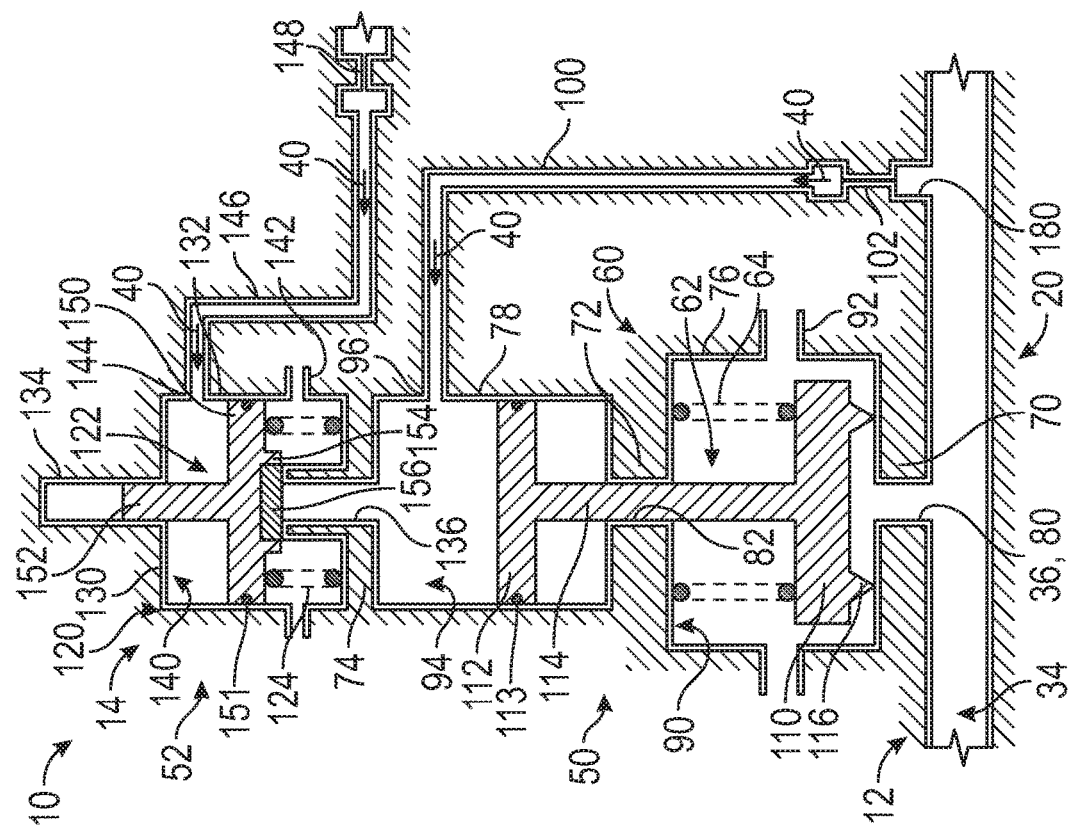
FIG. 5 is a schematic illustration of the valve assembly of the inflation system in a closed position.

The pressure relief housing 60 defines a first charge port 96 that is fluidly connected to the second pressure relief cavity 94. The first charge port 96 may be defined by the second perimeter wall 78. The first charge port 96 may be fluidly connected to the pressure source 42 (as shown in FIGS. 1, 2, and 3) or aspirator downstream flow (as shown in FIGS. 4 and 5) through a first conduit 100 having a first restrictor 102. The first restrictor 102 may be a restriction orifice. The receipt of at least a portion of the first fluid flow 40 from the pressure source 42 (as shown in FIGS. 1, 2, and 3) or aspirator downstream flow (as shown in FIGS. 4 and 5) through the first conduit 100 and the first restrictor 102 into the second pressure relief cavity 94 pressure charges the second pressure relief cavity 94 to bias or positively close the first flow port 80 and/or the vent port 36 via the pressure relief valve poppet 62, as shown in FIGS. 1, 2, 4, and 5. The pressure charging of the second pressure relief cavity 94 isolates the pressure relief function of the pressure relief valve 50 during and until the inflation completes.

The pressure relief valve poppet 62 is movably disposed within the first pressure relief cavity 90 and the second pressure relief cavity 94 and is movable between an open position and a closed position. The pressure relief valve poppet 62 includes a first head 110, a second head 112, and a pressure relief valve stem 114.

The first head 110 is disposed within the first pressure relief cavity 90. In at least one embodiment, the first head 110 is spaced apart from and does not engage the first perimeter wall 76 of the pressure relief housing 60. The first head 110 includes a seal assembly 116 that is arranged to engage the first end wall 70 to seal, close, or block the first flow port 80 while the pressure relief valve poppet 62 is in the closed position, as shown in FIGS. 1, 2, 4, and 5. The first head 110 having the seal assembly 116 is spaced apart from the first end wall 70 to enable the first fluid flow 40 to flow through the first flow port 80 into the first pressure relief cavity 90 and out of the first vent port 92, as shown in FIG. 3.

The second head 112 is disposed within the second pressure relief cavity 94. In at least one embodiment, the second head 112 engages the second perimeter wall 78 of the pressure relief housing 60. The second head 112 may have a cross-sectional diameter or cross-sectional form that is less than a cross-sectional diameter or cross-sectional form of the first head 110. The second head 112 may be provided with a sealing member 113, such as a radial seal or o-ring seal that slidingly engages the second perimeter wall 78.

The pressure relief valve stem 114 extends between the first head 110 and the second head 112 and extends through the passageway 82. In at least one embodiment, the pressure relief valve stem 114 engages the second perimeter wall 78 of the pressure relief housing 60 that may facilitate the movement of the pressure relief valve stem 114 between the open and closed positions along the axis 54.

The first biasing member 64 is disposed within the first pressure relief cavity 90. The first biasing member 64 extends between the first wall 72 and the first head 110 of the pressure relief valve poppet 62. The first biasing member 64 is arranged to bias the first head 110 having the seal assembly 116 towards the closed position, as shown in FIGS. 1, 2, 4, and 5. The first biasing member 64 ensures that the pressure relief valve 50 closes when the fluid pressure within the fluid channel 34 falls below a threshold fluid pressure, such as the pressure relief valve cracking pressure.

The vent valve 52 includes a vent housing 120, a vent valve poppet 122, and a second biasing member 124.

The vent housing 120 includes a second end wall 130, a vent perimeter wall 132, and in some embodiments, the second wall 74. The second end wall 130 is spaced apart from and disposed opposite the first end wall 70 along the axis 54. The second end wall 130 is spaced apart from the second wall 74. The second end wall 130 defines a pocket 134 that extends along the axis 54 away from the second wall 74.

The vent perimeter wall 132 extends between the second end wall 130 and the second wall 74 along the axis 54.

The vent housing 120 defines a vent cavity 140, a second vent port 142, and a second charge port 144.

The vent cavity 140 is disposed between the second end wall 130 and the second wall 74 and is defined by the second end wall 130, the second wall 74, and the vent perimeter wall 132.

The second wall 74 defines a vent flow port 136. The vent flow port 136 fluidly connects the second pressure relief cavity 94 and the vent cavity 140.

The second vent port 142 may be defined by the vent perimeter wall 132. The second vent port 142 is fluidly connected to the vent cavity 140.

The second charge port 144 is fluidly connected to the vent cavity 140 and is spaced apart from the second vent port 142. The second charge port 144 may be defined by the vent perimeter wall 132, as shown in FIGS. 1 and 4. The second charge port 144 may be defined by the second end wall 130, as shown in FIGS. 2, 3, and 5. The second charge port 144 may be fluidly connected to the pressure source 42 through a second conduit 146 as shown in FIG. 1-5. In at least one embodiment, the second conduit 146 may include a second restrictor 148 as shown in FIGS. 1 and 4. The second restrictor 148 may be a restriction orifice. The receipt of at least a portion of the first fluid flow 40 from the pressure source 42 through the second conduit 146 and the second restrictor 148 biases or positively closes the vent flow port 136 via the vent valve poppet 122, as shown in FIGS. 1, 2, 4, and 5.

The vent valve poppet 122 is movably disposed within the vent cavity 140 and is movable between an open position and a closed position. The vent valve poppet 122 includes a valve head 150 and a valve stem 152 that extends from the valve head 150 and extends into the pocket 134. In at least one embodiment, the valve stem 152 may have an enlarged head that is received within the pocket 134, as shown in FIGS. 2, 3, and 5. The valve stem 152 may be provided with a sealing member 153, such as a radial seal/o-ring seal that slidingly engages the pocket 134, as shown in FIGS. 2, 3, and 5.

The valve head 150 is disposed within the vent cavity 140. In at least one embodiment, the valve head 150 engages the vent perimeter wall 132 of the vent housing 120. The valve head 150 defines a retention member 154 that is arranged to receive and retain a face seal 156 that is arranged to engage at least one of the second wall 74 and/or the vent flow port 136 to seal, close, or block the vent flow port 136 while the vent valve poppet 122 is in the closed position, as shown in FIGS. 1, 2, 4, and 5. The valve head 150 having the face seal 156 is spaced apart from at least one of the second wall 74 and/or the vent flow port 136 to enable at least a portion of the first fluid flow 40 to flow through the vent flow port 136 into the vent cavity 140 and out of the second vent port 142 after completion of inflation of the inflatable structure or device, as shown in FIG. 3. The valve head 150 may be provided with a sealing member 151, such as a radial seal/o-ring seal that slidingly engages the vent perimeter wall 132.

The second biasing member 124 is disposed within the vent cavity 140. The second biasing member 124 extends between the second wall 74 and the valve head 150 of the vent valve poppet 122. The second biasing member 124 is arranged to bias the valve head 150 towards the open position.

The pressure relief valve 50 and the vent valve 52 may be kept positively closed responsive to the first fluid flow 40 from the pressure source 42 during the inflation of the inflatable structure or device, as shown in FIGS. 1, 2, 4 and 5. The first fluid flow 40 from the pressure source 42 may flow through the first conduit 100 and through the first charge port 96 and into the second pressure relief cavity 94 to bias the second head 112 towards the first wall 72 and ultimately biases the first head 110 of the pressure relief valve poppet 62 towards the first end wall 70 to block the first flow port 80. The first fluid flow 40 from the pressure source 42 may also flow through the second conduit 146 and through the second charge port 144 and into the vent cavity 140 to bias the valve head 150 towards the second wall 74 to block the vent flow port 136. The positive closing of pressure relief valve 50 by the pressure in second pressure relief cavity 94 ensures the isolation of pressure relief function of the pressure relief valve during the inflation of inflatable devices.

The vent valve 52 is arranged to move from the closed position towards the open position responsive to a decrease in the first fluid flow 40 from the pressure source 42 proximate the end of the inflation or immediately after the inflation of the inflatable structure or device. The moving of the vent valve 52 towards the open position vents out or relieves the pressure from the second pressure relief cavity 94 through the vent flow port 136 and the second vent port 142 after completion of inflation of the inflatable structure or device. The decrease of the fluid pressure within the second pressure relief cavity 94 facilitates the further opening of the pressure relief valve 50.

The second restrictor 148 restricts the first fluid flow 40 from entering the vent cavity 140 of the vent valve 52. The first restrictor 102 restricts the first fluid flow 40 from entering the second pressure relief cavity 94 of the pressure relief valve 50, decreasing the fluid pressure within the second pressure relief cavity 94. In response to this pressure decrease, the pressure relief valve 50 starts to open as shown in FIG. 3. A fluid flow 160 through the vent port 36 and into the first flow port 80 urges or biases the first head 110 of the pressure relief valve poppet 62 away from the first end wall 70 and opens the first flow port 80 such that the fluid flow 160 vents through the first vent port 92, as shown in FIG. 3. The fluid flow 160 may be the first fluid flow 40 from the pressure source 42, back flow from the inflatable structure or device, or mixed flow from the pressure source 42 and ambient air or the second fluid flow 46. Responsive to decreases in the first fluid flow 40 from the pressure source 42, the second biasing member 124 urges the valve head 150 to move further away from the second wall 74, opening the vent flow port 136 such that the fluid pressure decreases within the second pressure relief cavity 94 and further opens the pressure relief valve 50. In at least one embodiment, the pressure relief valve 50 may be arranged to open prior to the vent valve 52 opening. The first biasing member 64 biases the pressure relief valve 50 towards the closed position in case the pressure in fluid channel 34 is less than the specified cracking pressure value.

As shown in FIGS. 2, 3, and 5, an additional vent port 170 may be defined by the pocket 134 of the second end wall 130 of the vent housing 120. The additional vent port 170 enables the first fluid flow 40 from the pressure source 42 to also vent through the additional vent port 170. The additional vent port 170 vents a portion of the first fluid flow 40 after the required inflation of inflatable. The vent valve 52 may be provided with thermal compensators to compensate for pressure fluctuations or variations based on changes in ambient temperature or prevailing temperature. The thermal compensator(s) enables the advancement of actuation of the vent valve poppet 122 at elevated temperatures making the valve assembly 14 more robust to temperature variations.

As shown in FIGS. 4 and 5, the first conduit 100 having the first restrictor 102 may be directly tapped into the fluid channel 34 of the aspirator body 20 of the aspirator 12 through another vent port 180 that is spaced apart from the vent port 36.

The valve assembly 14 having the pressure relief valve 50 and the vent valve 52 that is integrated with the aspirator 12 eliminates the conventional pressure relief devices that are embedded into the current inflatable structures or device. The elimination of conventional pressure relief devices from the current inflatable structure or devices may remove hard spots from the inflatable structure or device as well as reduce external leakage by eliminating interface joints. The valve assembly 14 also includes thermal compensation features to compensate for thermal variations.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An inflation system, comprising:
    an aspirator having an aspirator body defining an outlet fluidly connected to an inflatable structure, a vent port, and an inlet fluidly connected to a pressure source; and
    a valve assembly fluidly connected to the aspirator body through the vent port, the valve assembly comprising:
        a pressure relief valve, having:
            a pressure relief housing defining a first pressure relief cavity and a second pressure relief cavity, and
            a pressure relief valve poppet movably disposed within the first pressure relief cavity and the second pressure relief cavity, and
        a vent valve, having:
            a vent housing defining a vent cavity, and
            a vent valve poppet movably disposed within the vent cavity.

2. The inflation system of claim 1, wherein the pressure relief valve poppet includes a first head disposed within the first pressure relief cavity, a second head having a radial seal disposed within the second pressure relief cavity, and a pressure relief valve stem extending between the first head and the second head.

3. The inflation system of claim 2, wherein the pressure relief valve housing includes a first end wall defining a first flow port and a first wall defining a passageway through which the pressure relief valve stem extends, the first wall being disposed between the first pressure relief cavity and the second pressure relief cavity.

4. The inflation system of claim 3, further comprising: a first biasing member extending between the first wall and the first head and arranged to bias the pressure relief valve poppet towards a closed position.

5. The inflation system of claim 4, wherein the pressure relief housing defines a first vent port that is fluidly connected to the first pressure relief cavity.

6. The inflation system of claim 4, wherein the pressure relief housing defines a first charge port that is fluidly connected to the second pressure relief cavity and the pressure source.

7. The inflation system of claim 6, wherein at least one of the pressure relief valve housing and the vent housing includes a second wall that extends between the second pressure relief cavity and the vent cavity.

8. The inflation system of claim 7, wherein the vent housing includes a second end wall that is spaced apart from the second wall.

9. The inflation system of claim 8, further comprising: a second biasing member extending between the second end wall and a valve head having another radial seal of the valve poppet.

10. The inflation system of claim 9, wherein the valve head is disposed within the vent cavity.

11. The inflation system of claim 9, wherein the second wall defines a vent flow port.

12. The inflation system of claim 11, wherein the vent housing defines a second vent port.

13. The inflation system of claim 12, wherein the vent housing defines a second charge port that is fluidly connected to the pressure source.

14. The inflation system of claim 13, wherein responsive to a fluid flow from the pressure source through at least one of the first charge port and the second charge port, the first head is biased towards the first end wall to block the first flow port and the vent valve is biased towards the second wall to vent a fluid pressure from the second pressure relief cavity.

15. The inflation system of claim 13, wherein responsive to a decrease in a fluid flow from the pressure source through at least one of the first charge port and the second charge port, the first head moves away from the first end wall and the second biasing member urges the valve head away from the second wall.

* * * * *